No Printed Specification Available
2619X
T. PULLEN.
BREAKING FLAX AND HEMP
Patented June 20, 1816.
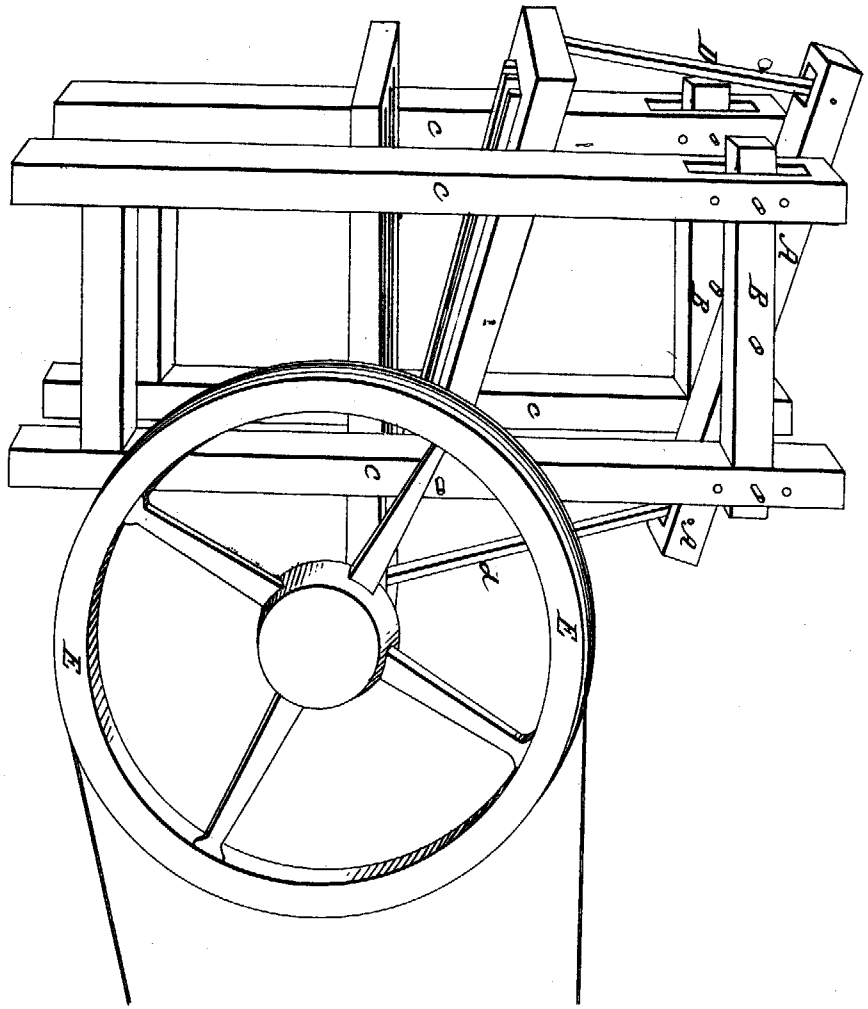
THE NORRIS PETERS CO., PHOTO-LITHO., WASHINGTON, D. C.

[illegible] 20. 1816

Thomas Pullen 2619X
Letters Patent

The Schedule referred to in these Letters Patent and making part of the same containing a description in the words of the said Thomas Pullen himself of his machine for Breaking Flax or Hemp

---

The Machine consists of a lever with a pivot through the centre which pivot passes through two blocks of timber. that is one on each side which blocks are supported by four posts two on each side of the lever and the ends of the blocks are <u>tenanted</u> and pass through the mor<u>tices</u> in the ends of the posts which mor<u>tices</u> are sufficiently large to admit the blocks up and down some inches, thereby permitting the lever to act with more force upon the brake which brake is similar to the brakes now in use by hand & is connected to the end of the lever by means of a rod of wood or iron, having a pivot or joint at each end. the other end of the lever is connected to a crank or wheel the same way by means of a rod which has its regulating motion by means of a Balance wheel, the wheel is put in motion by means of a band passing round a large wheel designed to go by a Horse or any other mechanical movement. Two upright posts are fixed with two rollers to act a guide to the cord or rope Witnesses
John Stickney
[illegible] West Thomas Pullen Ex[illegible]
ChW.